Sept. 13, 1966   M. E. WHITMORE   3,272,388
DISPENSING METHOD AND APPARATUS
Filed Nov. 5, 1964

INVENTOR.
MAX E. WHITMORE
BY Williams, David,
Hoffmann & Fount
ATTORNEYS

United States Patent Office 3,272,388
Patented Sept. 13, 1966

3,272,388
DISPENSING METHOD AND APPARATUS
Max Earl Whitmore, Chagrin Falls, Ohio
(1373, Suite A, Bluff Ave., Columbus, Ohio 43212)
Filed Nov. 5, 1964, Ser. No. 409,232
9 Claims. (Cl. 222—129.1)

The present invention relates to a dispensing method and apparatus providing for the dispensing of highly viscous fluid material and particularly to a dispensing method and apparatus wherein the material is an edible fluid dispensed by a single material dispensing mechanism which is capable of dispensing a number of different flavors of such material.

The principal object of the present invention is the provision of a new and improved dispensing method and mechanism providing for the dispensing of a plurality of different flavors of congealed fluid material for human consumption, such as soft ice cream and frozen custard, and which provides for effective flavoring of the material in accordance with the desires of the person to consume the material.

A further object of the present invention is the provision of a frozen custard or ice cream dispensing mechanism which is constructed and arranged so as to dispense a flavor of soft ice cream or frozen custard in accordance with the desires of the person to receive the soft ice cream or custard and which is simple in construction, durable and reliable in operation.

A further object of the invention is a new and improved method of adding a flavoring fluid to an edible, congealed, fluid material as the material is being dispensed establishing a constant flow of the material to be flavored and injecting a preselected flavoring fluid into the flow of the congealed material at a plurality of spaced locations.

A still further object of the present invention is the provision of a new and improved dispensing device for dispensing edible, congealed, fluid material such as frozen custard or soft ice cream wherein the dispensing device dispenses the material through a suitable dispensing nozzle and suitable flavoring means are positioned adjacent to the nozzle and are selectively operable to flavor the material as it flows therethrough.

A further object of the present invention is the provision of a dispensing device, as noted in the next preceding paragraph, wherein the flavoring fluid is injected into the material at a plurality of spaced locations and the means for injecting the flavoring fluid is operated in response to establishing flow of the congealed material through the nozzle.

A still further object of the present invention is the provision of a new and improved dispensing device wherein removable flavoring grids are selectively positionable beneath the dispensing nozzle and through which flavoring fluid is injected into the material at a plurality of spaced locations to flavor the material as it flows from the dispensing nozzle.

A still further object of the present invention is the provision of a dispensing device, as noted in the next preceding paragraph, wherein the grids are connected to different flavoring tanks by flexible connections which permit the grids to be moved from a remote storage position to a position under the dispensing nozzle so that the material flows through the grids.

A still further object of the present invention is the provision of a new and improved flavoring device connectable to a dispensing device which dispenses an edible, congealed, fluid material through a suitable dispensing nozzle and includes an attachment connectable to the nozzle and defining an extension of the nozzle and which is arranged to receive at least one flavoring grid through which a flavoring fluid is injected into the congealed material as the material flows through the grid.

A still further object of the present invention is the provision of a new and improved dispensing device having a flavoring grid through which material to be flavored flows and which includes tube members which form a grid-like structure and through which flavoring fluid flows and which have openings for directing the flavoring fluid into the material at a plurality of spaced locations to be flavored.

A still further object of the present invention is the provision of a new and improved dispensing device having a grid-like structure through which material is dispensed and through which grid structure a flavoring fluid is flowed and injected into the material as it flows through the grid-like structure, and wherein the grid structure is connected to a plurality of flavoring tanks by conduit means for selectively directing flavoring fluid to the grid structure and to a cleaning solution tank which is operable to flush the grid of flavoring fluid after a flavor has been flowed through the grid.

Further objects and advantages of the present invention will be apparent to those skilled in the art to which it relates from the following detailed description of the preferred embodiment thereof made with reference to the accompanying drawings and forming a part of the specification in which.

Figure 1:
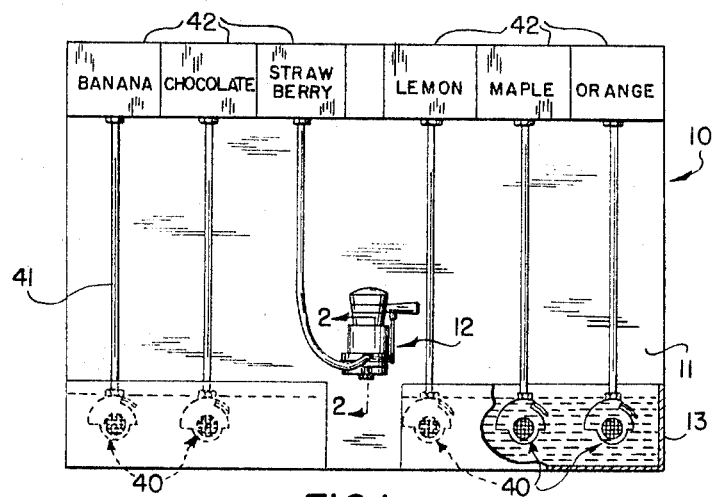
FIG. 1 is a schematic front elevational view of a dispensing device embodying the present invention.

The present invention provides an improved dispensing device for the dispensing of highly viscous fluid substances, and particularly edible fluids, such as frozen custard and soft ice cream, and particularly provides a dispensing device wherein the edible material is flavored as it is dispensed in accordance with the desires of the person receiving the ice cream. As representing the preferred embodiment of the present invention, FIG. 1 illustrates a dispensing device 10 for dispensing a fluid material such as frozen custard. The dispensing device 10 includes a dispensing cabinet 11 which encloses the various operating structures of the frozen custard dispensing device and in which the custard is made and a supply thereof maintained under pressure, and a dispensing nozzle mechanism 12 supported on the forward portion of the cabinet 11 and through which the custard is dispensed.

The dispensing nozzle mechanism 12 may be of any suitable construction and is illustrated in the drawings as comprising a dispensing nozzle housing 15 having a projecting portion 16 which is secured to the front portion of the dispensing cabinet 11 by means of a suitable nut type conecting means 17. The housing 15 defines an outlet nozzle portion 18 through which frozen custard is dispensed. The housing 15 also defines a fluid passageway extending through portion 16 for establishing communication between the interior of the dispensing cabinet 11 and the outlet nozzle portion 18 of the dispensing nozzle mechanism 12. Located in the fluid passageway is a suitable valve mechanism, not shown, which is actuated by a handle 20 which projects outwardly of the dispensing nozzle housing 15. The handle 20 may be manually gripped and moved in an arcuate path about the housing 15 in order to actuate the valve mechanism which provides for the flow of fluid from the cabinet 11 through the dispensing nozzle 18.

In accordance with the present invention the dispensing device 10 is constructed so as to dispense the particular flavor of custard which the person receiving the custard desires. The dispensing mechanism includes a suitable flavor attachment adaptor 30, suitably connected to the dispensing nozzle portion 18 of the housing 15 and projecting downwardly therefrom. The adaptor 30 comprises an annular sleeve having a passageway 31 therethrough and a suitable set screw 32 which secures the adaptor 30 in position on the nozzle 18.

Figures 2, 3:
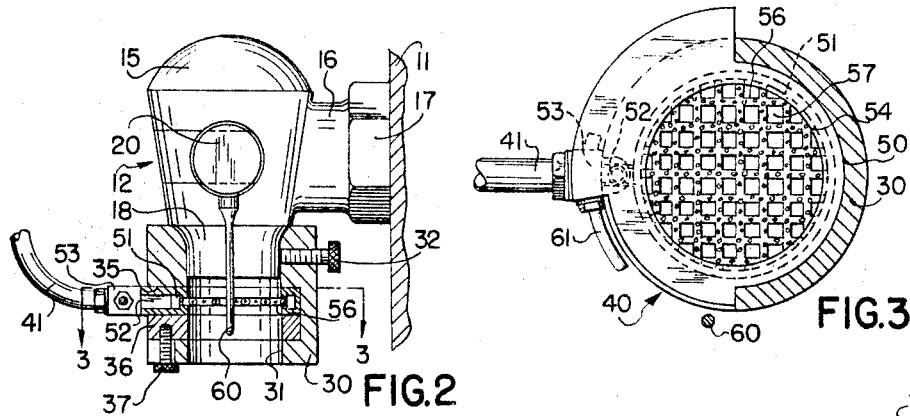
FIG. 2 is a fragmentary sectional view of the dispensing device shown in FIG. 1 taken approximately along the section line 2—2 of FIG. 1.
FIG. 3 is a sectional view of the apparatus shown in FIG. 2 taken approximately along the section line 3—3 of FIG. 2.

The adaptor 30 also includes a radially extending slot 35 which intersects the passageway 31. As shown in FIG. 2, the adaptor 30 also includes a spacer ring 36 secured in the slot 35 by means of a suitable screw 37 which extends through the adaptor 30 and into the spacer 36. The function and purpose of the spacer will be described hereinbelow. It should also be noted that the spacer does not completely fill the slot 35 in the adaptor 30.

The slot 35 in the adaptor 30 is provided to receive any one of a plurality of grid structures designated 40 on the drawings. Each of the grid structures 40 is connected by suitable flexible conduit means 41 to a flavoring tank 42. The grid mechanism is adapted to be inserted in the slot 35 and when inserted in the slot 35 is located in the path of the flow of custard through the nozzle 18 and the frozen custard actually flows through the grid structure. The grid structure is constructed so as to receive flavoring fluid from the tank 42 through the flexible conduit 41 and to inject the flavoring fluid into the custard as it flows therethrough. Each of the grid structures 40 is identical in construction and only one of the grid structures will be described hereinbelow in detail. The grid structure 40 comprises a suitable ring member 50 having a circular fluid passageway 51 extending circumferentially therearound. The fluid passageway 51 is connected with the fluid conduit 41 by a connecting passage portion 52. A suitable valve 53 is disposed in the grid 40 to control the flow of fluid from conduit 41 to the circular passageway 51.

Each of the grid structures comprises a plurality of interconnected hollow tubular members 56 arranged, in the preferred embodiment, in a common plane and defines a checkerboard type of pattern. The tubes 56 are interconnected with each other and the opposite ends of each tube are connected to two spaced portions of the circular passageway 51 to thereby provide for fluid communication between passageway 51 and tubes 56. A plurality of flavor-injecting openings 54 are located in the periphery of each tube 56 through which the flavoring fluid flows as it is injected into the material to be flavored as the latter flows through the grid structure. The checkerboard grid pattern defines a plurality of spaces 57 between adjacent tubes to facilitate flow of the custard or like material through the grids.

In order to insure effective flavoring of the custard or like material it is necessary that the flavoring syrup is injected into the custard at the appropriate time. This is accomplished by providing a valve actuating mechanism for the valve 53 to insure that the flavoring syrup and the unflavored custard arrive at the grids at the same time. The valve actuator comprises an actuating member 60 secured to and dependent from the handle 20 of the dispensing mechanism 12 and is moved with the handle in an arcuate path. The lower portion of the actuating member 60 engages the end of the valve actuator 61 remote from the valve 53 and continued movement of the handle in the arcuate path moves the valve actuator 61 clockwise as viewed in FIG. 3 to thereby open normally closed valve 53 and permit flow of the flavoring fluid from conduit 41 into the circular passageway 51 and in turn into the tubes 56 and out through openings 54. The valve actuator 61 and actuating member 60 are adjusted relative to one another to insure delivery of the flavoring syrup to the grid in time to be mixed with the custard which is being dispensed through housing 15.

A suitable trough 13 is provided on the face of cabinet 11 for holding a cleaning solution such as water. During non-use, the grids are suspended in the cleaning solution so as to prevent the flavoring fluid injecting openings and tubes 56 from becoming clogged by any flavoring fluid remaining therein.

The operation of the preferred embodiment of the apparatus disclosed in FIGS. 1 through 3 is as follows: a particular grid corresponding to the desired custard flavor is selected and removed from trough 13 and inserted in slot 35 in the attachment 30. The grids are held in place in the attachment by any suitable means such as by magnetism, etc. Once the grid is in place the operator moves handle 20 in an arcuate path which establishes flow of the custard from the cabinet 11, which provides a reservoir for maintaining a supply of custard under pressure, into the nozzle portion 18 and simultaneously opens valve 53 in the grid through member 60 and valve actuator 61 to thereby establish flow of the flavoring syrup between one of the flavoring tanks 42 and the openings 54 in the tubes 56 of the grid 40. The congealed fluid material to be flavored is forced around tubes 56 and through openings 57 into passageway 31 from which point the flavored custard or similar material is collected into an appropriate container such as a cone or dish. As the unflavored custard is forced around tubes 56, the flavoring syrup is injected therein evenly throughout the custard at a plurality of spaced locations and a mixing of the flavoring and custard is accomplished by forcing the custard through the restricted openings 57 to distribute the flavoring throughout the custard. After the desired amount of custard has been dispensed, handle 20 is returned to its initial position and in so moving the flow of the congealed material and the flavoring syrup is interrupted. Thereafter, grid 40 is removed from the attachment 30 and deposited in the cleaning solution in trough 13.

In the event it is desired to dispense a serving of custard having a plurality of flavors, the spacer ring 36 is removed from the adaptor 30 by loosening screw 37 and then two grids can be inserted into the adaptor. In this arrangement the ends of the valve actuators 61 of each grid would be in vertical alignment and actuated simultaneously by the actuating member 60 on the handle 20 to thereby dispense two different flavoring syrups to the custard passing therethrough.

Figures 4, 5:
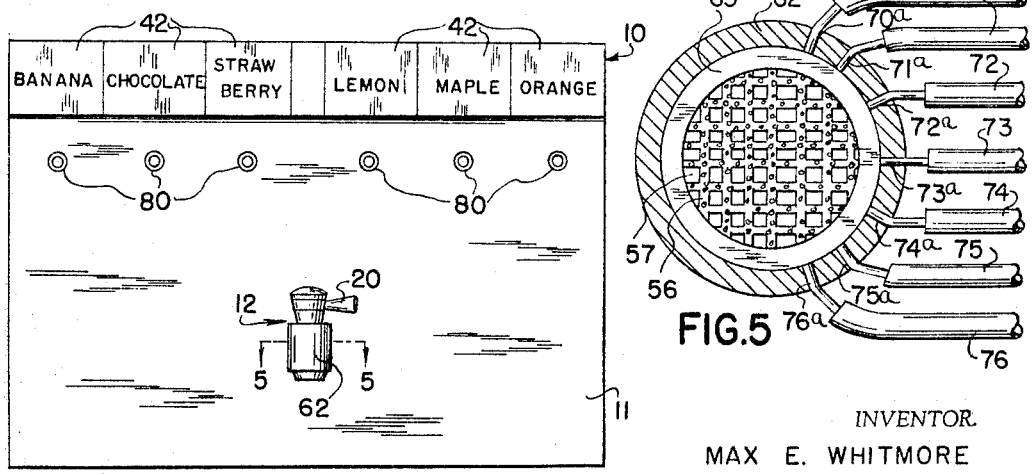
FIG. 4 is a schematic front elevational view of a modified form of dispensing device.
FIG. 5 is a fragmentary sectional view of the dispensing device shown in FIG. 4 taken approximately along the section line 5—5 thereof.

The modified embodiment of the present invention shown in FIGS. 4 and 5 is similar in construction to the embodiment shown in FIG. 1 and the same reference characters used to designate parts of the structure shown in FIGS. 1 to 3 are used to designate the corresponding parts of the structure shown in FIGS. 4 and 5.

The dispensing apparatus shown in FIG. 5 comprises a dispensing cabinet 11 and a dispensing nozzle mechanism 12 which includes a suitable dispensing valve (not shown) actuated by a handle 20. The dispensing cabinet 11 has a plurality of flavor tanks 42 mounted thereon, each containing a supply of a particular flavor of flavoring fluid or syrup which is to be injected into the custard as the custard is dispensed.

The dispensing nozzle mechanism 12 includes a permanent type grid structure which is an integral part of the nozzle 12 and functions to inject the flavoring syrup into the custard as the custard flows through the grid structure. The grid structure is similar to the grid structure 41 described hereinabove in relation to the mechanism shown in FIG. 1 and generally includes a nozzle housing having a circumferential passageway 63 extending therearound, which passageway is connected to and in communication with the ends of a plurality of tubes 56 having flavor-injecting openings 54 therein around the periphery thereof. The tubes 56 are disposed in a common plane and are arranged in a checkerboard-type pattern and which pattern defines spaces 57 between adjacent tubes 56 through which the congealed fluid flows. The passageway 63 is connected with a plurality of fluid conduits designated 70 to 76 through passageways 70a to 76a in housing 62 through which the fluid conduits extend. The fluid conduits 70–75 are each connected with one of the flavoring tanks 42 so that flavoring syrup flows through one of the conduits 70–75, into circular conduit 63, into tubes 56, and out opening opening 54 to flavor the custard presented thereto. The conduit 76 is connected with a suitable supply of water which is utilized to rinse or flush the flavoring fluid from the grid structure so that the flavor just dispensed does not mix with the next selected flavoring when it is introduced into the grid. The water flush also keeps the flavor injecting openings and tubes from becoming clogged by any flavoring syrup remaining therein.

The dispensing mechanism of FIG. 4 includes a control system for effecting the operation thereof and which comprises a plurality of manually actuated switches operated by a plurality of buttons 80 located on the dispensing cabinet adjacent to a corresponding flavor tank. Each switch when actuated by depressing the corresponding button sets up a circuit including a solenoid for operating a valve in a selected flavor fluid line, which valve when actuated establishes flow of the flavoring syrup from the tank into the grid. The solenoid is energized by the initial turning of handle 20. The valve in the nozzle 12 which is actuated by handle 20 is designed so that there is a time lapse between initial movement of the handle and the opening of the valve which establishes flow of custard to the grid. This time delay is sufficient to permit the valve in the flavoring line to open so that the flavoring syrup can circulate through tubes 56 and be disposed at openings 54 at substantially the same time as the custard to be flavored arrives at the upper surface of the grid. This arrangement will insure flavoring of the initial quantity of dispensed custard. After a desired quantity of custard has been dispensed, the valve in the nozzle mechanism 12 is closed by returning handle 20 to its starting position at which position it de-energizes the flavoring solenoid and energizes a solenoid for operating a valve disposed in the flush conduit 76 thereby opening the valve to emit water into the grid to flush the flavoring just dispensed from passageway 63, tubes 56 and openings 54. A suitable time delay mechanism could be provided in the latter circuit to close the valve in the flush line after a predetermined time lapse to shut off the flow of water or other cleaning solution into the grid. Of course, if an unflavored custard is desired, the operator turns handle 20 without first pressing any of the flavor buttons 80. Various circuits could be readily designed to accomplish the above operations and for this reason a specific circuit has not been illustrated.

Briefly summarizing the operation of the device described in FIGS. 4 and 5, an operator selects and actuates a button corresponding to the custard flavor desired and thereafter rotates handle 20 which energizes a solenoid for a valve in the conduit corresponding to the flavor selected, energization of the solenoid causes opening of the valve to permit flow of the flavoring syrup into the grid. Continued rotation of handle 20 opens the valve in the custard passageway to effect delivery of custard to the upper face of the grid. The handle is left in the latter position until a desired quantity of flavored custard has been dispensed, at which time the operator rotates the handle in the opposite direction to shut off the flow of custard and flavoring syrup to the grid and thereafter actuates a solenoid for operating a valve in line 76 to open the valve and emit a cleaning solution into the grid to flush same. After a predetermined time lapse, a time delay mechanism closes the valve and shuts off the flow of cleaning solution and the machine is ready for another cycle of operation.

Although the tubes 56 in the grids shown in FIGS. 3 and 5 are illustrated as being disposed in a common plane, it should be appreciated that the tubes extending in one direction could be spaced above the tubes which extend approximately normal thereto without departing from the spirit of the invention. In such an arrangement of tubes the upper and lower layer of tubes will not be directly interconnected but each layer would, however, be connected to the same annular conduit at their respective ends.

From the above description, it should be readily apparent that applicant has provided a highly improved dispensing mechanism which is capable of flavoring edible substances which are dispensed therefrom. It should be understood that the preferred embodiments described hereinabove have been described in considerable detail and that certain modifications, changes and adaptations may be made therein and it is hereby intended to cover all such modifications, changes and adaptations coming within the scope of the appended claims.

I claim:

1. An apparatus for flavoring and dispensing an edible, congealed, fluid material comprising reservoir means for maintaining a supply of the congealed material under pressure; a dispensing nozzle means adjacent the reservoir means and having a discharge portion; means defining a passageway for providing fluid communication between the reservoir means and the discharge portion of the nozzle means; a valve disposed in the passageway operable to control the flow of the congealed material therethrough; supply means for maintaining a supply of separated flavoring fluids; a plurality of grid structures connected to the supply means by flexible fluid conduits, each of the grid structures being selectively positionable in the passageway and operable to inject a preselected flavoring fluid into the congealed material as the latter flows through the grid structure.

2. An apparatus as defined in claim 1 wherein the nozzle means includes a tubular attachment member which defines a portion of the passageway, the attachment having a slot therein adapted to receive at least one of the grid structures.

3. An apparatus as defined in claim 1 including a trough means for containing a cleaning solution and disposed relative to the supply means so that the grid structures can be suspended in the cleaning solution during non-use.

4. An apparatus for flavoring and dispensing an edible, congealed fluid material comprising reservoir means for maintaining a supply of the congealed material under pressure, a dispensing nozzle means adjacent the reservoir means and having a discharge portion; means defining a passageway for providing fluid communication between the reservoir means and the discharge portion of the nozzle means; a valve disposed in the passageway operable to control the flow of the congealed material therethrough; supply means for maintaining a supply of separated flavoring fluids; a grid structure disposed in the passageway and having flavor injecting openings therein; separate fluid conduit means connecting the grid structure to each of the flavoring fluids; and control means for selectively establishing fluid flow through a fluid conduit between the grid structure and one of the flavoring fluids to inject the flavoring fluid into the congealed material as the latter flows through the grid structure.

5. Apparatus as defined in claim 4 including a reservoir for maintaining a supply of cleaning solution, conduit means interconnecting the cleaning solution reservoir and grid structure; and control means for establishing fluid communication between the cleaning solution reservoir and grid structure so as to provide a flow of the cleaning solution through the grid structure to thereby flush the grid structure.

6. An apparatus as defined in claim 4 wherein the grid structure includes a plurality of tubular members arranged in a checkerboard pattern and defining spaces between adjacent tubular members through which the congealed material flows, each of the tubular members having a plurality of flavor injecting openings in the periphery thereof and having their ends in communication with a common circular passageway which in turn is in fluid communication with the conduit means.

7. An apparatus for flavoring and dispensing an edible, congealed, fluid material comprising reservoir means for maintaining a supply of the congealed material under pressure, dispensing nozzle means adjacent said reservoir means and having a discharge portion, means defining a passageway for providing fluid communication between the reservoir means and the discharge portion of the nozzle means, a valve disposed in the passageway operable to control the flow of the congealed material therethrough, supply means for maintaining a supply of separated flavoring fluids, and means for selectively injecting at least one of the flavoring fluids into the congealed material as the latter flows through the passageway and prior to being discharged from the discharge portion of the nozzle means including a grid structure in the passageway and through which the flavoring fluid is injected into the congealed material at a plurality of spaced locations throughout the material, said grid structure comprising a plurality of tubular members arranged to define spaces between adjacent tubular members and through which spaces the congealed material flows, said tubular members having a plurality of openings therein for injecting flavoring fluid into the material flowing through the spaces.

8. An apparatus for flavoring material dispensed from a dispensing mechanism having a reservoir for maintaining a supply of congealed material under pressure and a dispensing nozzle having a discharge portion which defines part of a passageway through which the material flows and in which a valve, operable to control the flow of the congealed material, is disposed comprising; an attachment positionable on the discharge portion of the nozzle to form an extension of the passageway; supply means for separately maintaining a plurality of flavoring fluids; grid means connected by fluid conduit means to the supply means, said attachment having a grid supporting portion for removably supporting the grid means in position in the flow of the congealed material to inject flavoring fluid into the congealed material as the latter flows therethrough, said grid means including a plurality of grid structures, conduit means connecting each of said grid structures to a separate flavoring fluid, each grid structure including a plurality of tubular members arranged in a checkerboard pattern and defining spaces between adjacent tubular members through which the material flows, and each of the tubular members having a plurality of flavor injecting openings in the periphery thereof.

9. An apparatus for flavoring material dispensed from a dispensing mechanism having a reservoir for maintaining a supply of congealed material under pressure and a dispensing nozzle having a discharge portion which defines part of a passageway through which the material flows and in which a valve, operable to control the flow of the congealed material, is disposed comprising; an attachment positionable on the discharge portion of the nozzle to form an extension of the passageway; supply means for separately maintaining a plurality of flavoring fluids; grid means connected by fluid conduit means to the supply means, the attachment having a grid supporting portion for removably supporting the grid means in position in the flow of the congealed material to inject flavoring fluid into the congealed material as the latter flows therethrough, said attachment further comprising a tubular sleeve defining a passageway therethrough and having means defining a radial slot therein adapted to receive the grid means; and means for connecting the attachment to the outlet portion of the nozzle of the dispensing mechanism.

References Cited by the Examiner
UNITED STATES PATENTS

| | | | |
|---|---|---|---|
| 1,261,986 | 4/1918 | White | 222—129.1 |
| 1,281,592 | 10/1918 | Laskey | 107—1.4 X |
| 2,246,871 | 6/1941 | Balch | 107—54.4 X |
| 2,313,060 | 3/1943 | Friedman | 107—1.4 |
| 2,531,127 | 11/1950 | Hershey et al. | 107—1.4 |
| 2,858,217 | 10/1958 | Benson. | |
| 2,858,219 | 10/1958 | Benson. | |
| 3,168,967 | 2/1965 | Giampa | 222—129.1 |
| 3,213,808 | 10/1965 | Schafer | 107—54.2 |

RAPHAEL M. LUPO, *Primary Examiner.*